Patented Aug. 14, 1945

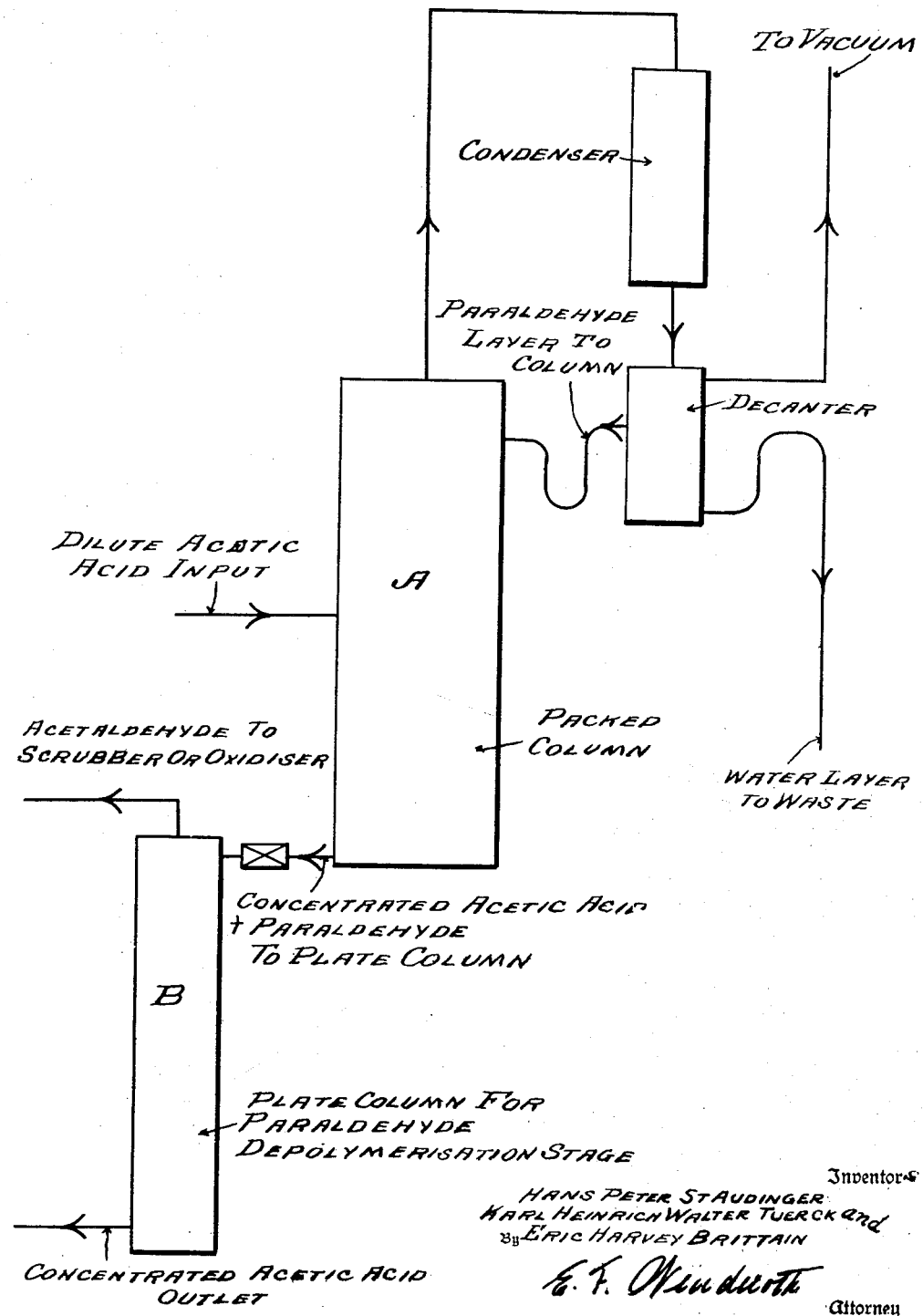

2,382,181

UNITED STATES PATENT OFFICE 2,382,181

CONCENTRATION OF AQUEOUS ACETIC ACID

Hanns Peter Staudinger, Ewell, Karl Heinrich Walter Tuerck, Banstead, and Eric Harvey Brittain, Epsom Downs, England, assignors to The Distillers Company Limited, Edinburgh, Scotland, a British company Application July 15, 1942, Serial No. 451,073
In Great Britain June 17, 1941

9 Claims. (Cl. 202—42)

This invention is for improvements in or relating to the concentration of aqueous acetic acid.

The methods hitherto practiced suffer from the disadvantage that there is no solvent which is able to entrain a satisfactory proportion of water during distillation and which, at the same time, is easily separable from the acetic acid. It has been proposed to utilise two solvents and to use them in two stages. But such a process has proved to be too complicated for industrial use.

According to the present invention, paraldehyde is used as an entraining agent in the distillation of dilute aqueous acetic acid. We have found that paraldehyde is able to entrain water in the form of an azeotropic mixture, boiling at 90° C./760 mm. Hg, and consisting of 2.5 parts of paraldehyde and 1 part of water, which separates into 2 layers accordingly.

Paraldehyde can be easily depolymerised to acetaldehyde, and thus any excess of paraldehyde remaining in the concentrated acetic acid can be readily converted into monomeric acetaldehyde which is either removed as such or converted into acetic acid by oxidation.

The accompanying sheet of drawings illustrates the process according to the present invention, the various legends indicating the various devices employed and the nature of the various fluids flowing through the apparatus.

In carrying out the process of our invention the aqueous acetic acid, which must be free from strong acids or other substances which cause depolymerisation of the paraldehyde, is distilled with about the calculated amount of paraldehyde corresponding to the water to be removed so that, at the top of the rectifying column A, a mixture of paraldehyde and water is obtained, while at the bottom of the column B the water-free acid is withdrawn and, if it contains any residual paraldehyde, this is fed into a second small column in which the paraldehyde is depolymerised and distilled off as acetaldehyde which, because of its low boiling point, is easily separable from the acetic acid. Pure acetic acid is drawn off as vapour or liquid from one of the lower parts of the second column B. We prefer to effect the azeotropic distillation under such a vacuum that distillation occurs at a temperature below 80° C. so that there is no possibility of the paraldehyde depolymerising. The depolymerisation of the residual paraldehyde, if any, may be effected in a second column B by means of small amounts of sulphuric acid running down the column or by slowly fractionating the acetic acid-paraldehyde mixture under such conditions that only acetaldehyde vapours can leave the top of the column. The acetaldehyde vapours can be condensed or absorbed directly into a paralydehyde scrubbing liquid containing traces of sulphuric acid and can thus be converted into paraldehyde which may be returned to the concentration process.

The following example illustrates the manner in which the invention may be carried into effect:

Into a distillation column A, which is kept under a vacuum of 160 mm. Hg, 50% by weight aqueous acetic acid is fed at such a point that the rising vapours meet a current of paralydehyde flowing down from the top of the column. The vapours which pass out at 59° C. and which contain 2.8 parts by volume of paralydehyde and one part by volume of water are condensed and the paralydehyde layer which separates out is continuously returned to the column A.

From the bottom of the column the hot liquid is withdrawn to the middle of a second column B, which works at normal pressure, and the reflux dephlegmator of which is so regulated that the temperature of the vapours leaving the top is not more than 25° C. The vapours are condensed and led into a receiver where they are absorbed by paralydehyde containing 0.1% by weight of sulphuric acid.

The liquid which leaves the bottom of the second column B is pure glacial acetic acid.

The method of this invention is especially useful when combined with an extraction process in which paraldehyde has been employed as the extracting agent for the extraction of acetic acid from aqueous solutions or if an excess of paraldehyde has been used so as to effect a quick and ready removal of the water at the top of the column.

What we claim is:

1. A method of dehydrating aqueous acetic acid which comprises the step of distilling off the water in azeotropic admixture with paraldehyde.

2. A method according to claim 1 wherein any excess of paraldehyde remaining in the dehydrated acetic acid is removed by heating the mixture to such a temperature that depolymerisation thereof occurs, the resulting acetaldehyde being removed by distillation.

3. A method according to claim 1 wherein the removal of water is effected under a reduced pressure such that the distillation temperature remains below 80° C.

4. A method of dehydrating aqueous acetic acid wherein aqueous acetic acid is fed to a distillation column in which paralydehyde is flowing down, the mixed vapours of water and paraldehyde are withdrawn at the top of the column, the acetic acid, containing paraldehyde, being withdrawn from the base of said column and fed to a second column fitted with a reflux dephlegmator so regulated that only acetaldehyde is removed, the glacial acetic acid being withdrawn from the base of the second said column.

5. A method of dehydrating aqueous acetic acid which comprises heating said aqueous acetic acid in a distillation column with paraldehyde, removing an azeotropic mixture consisting of water and paraldehyde, removing from the base of the column an anhydrous mixture of acetic acid and paralydehyde, heating said anhydrous mixture to cause depolymerisation of the contained paraldehyde to acetaldehyde and absorbing said acetaldehyde in liquid paraldehyde containing an acidic polymerising agent to regenerate paraldehyde.

6. A method of dehydrating aqueous acetic acid which comprises heating said aqueous acetic acid in a distillation column with paraldehyde, removing an azeotropic mixture consisting of water and paraldehyde, removing from the base of the column an anhydrous mixture of acetic acid and paraldehyde, heating said anhydrous mixture with an acidic depolymerising agent to cause depolymerisation of the contained paraldehyde to acetaldehyde and absorbing said acetaldehyde in liquid paraldehyde containing an acidic polymerising agent to regenerate paraldehyde.

7. A method of dehydrating aqueous acetic acid which comprises heating said aqueous acetic acid in a distillation column with paraldehyde, removing an azeotropic mixture consisting of water and paraldehyde, removing from the base of the column an anhydrous mixture of acetic acid and paraldehyde, heating said anhydrous mixture with sulphuric acid to cause depolymerisation of the contained paraldehyde to acetaldehyde and absorbing said acetaldehyde in liquid paraldehyde containing an acidic polymerising agent to regenerate paraldehyde.

8. A method of dehydrating aqueous acetic acid which comprises heating said aqueous acetic acid in a distillation column with paraldehyde, removing an azeotropic mixture consisting of water and paraldehyde, removing from the base of the column an anhydrous mixture of acetic acid and paraldehyde, and heating said anhydrous mixture with an acidic depolymerising agent to cause depolymerisation of the contained paraldehyde to acetaldehyde.

9. A method of dehydrating aqueous acetic acid which comprises heating said aqueous acetic acid in a distillation column with paraldehyde, removing an azeotropic mixture consisting of water and paraldehyde, removing from the base of the column an anhydrous mixture of acetic acid and paraldehyde, and heating said anhydrous mixture with sulphuric acid to cause depolymerisation of the contained paraldehyde to acetaldehyde.

HANNS PETER STAUDINGER.
KARL HEINRICH WALTER TUERCK.
ERIC HARVEY BRITTAIN.